United States Patent
Chang

(10) Patent No.: US 7,071,403 B2
(45) Date of Patent: Jul. 4, 2006

(54) METHOD OF ENABLING MIDI FUNCTIONS IN A PORTABLE DEVICE

(75) Inventor: Jen-Chun Chang, Taipei (TW)

(73) Assignee: Benq Corporation, Taoyuan (TW)

( * ) Notice: Subject to any disclaimer, the term of this patent is extended or adjusted under 35 U.S.C. 154(b) by 572 days.

(21) Appl. No.: 10/353,218

(22) Filed: Jan. 27, 2003

(65) Prior Publication Data

US 2004/0204062 A1    Oct. 14, 2004

(30) Foreign Application Priority Data

Sep. 13, 2002   (TW) ............................... 91120970 A

(51) Int. Cl.
*G10H 7/00* (2006.01)
(52) U.S. Cl. ........................................ 84/645
(58) Field of Classification Search ................ 84/645
See application file for complete search history.

(56) References Cited

U.S. PATENT DOCUMENTS

| 5,208,421 A | * | 5/1993 | Lisle et al. | .................. 84/645 |
| 5,300,725 A | * | 4/1994 | Manabe | ....................... 84/609 |
| 2003/0003968 A1 | | 1/2003 | Muraki | ....................... 455/567 |

FOREIGN PATENT DOCUMENTS

WO    01/56014 A1    8/2001

* cited by examiner

*Primary Examiner*—Jeffrey W Donels
(74) *Attorney, Agent, or Firm*—Ladas & Parry LLP

(57) ABSTRACT

A method of providing MIDI function on a portable device. The method includes setting a MIDI setting table on the device, according to which, the portable device can provide MIDI editing, recording, playing, and output functionality.

9 Claims, 6 Drawing Sheets

| Channel Choice | 1 | 2 | 1 | 3 | 4 |
|---|---|---|---|---|---|
| Time Point | 0 | 5 | 10 | 15 | 20 |

FIG. 5

| Channel Choice | 1 | 2 | 1 | 3 | 4 |
|---|---|---|---|---|---|
| Time Point | 0 | 5 | 10 | 15 | 20 |
| Operation | Enable | Enable | Disable | Enable | Enable |

METHOD OF ENABLING MIDI FUNCTIONS IN A PORTABLE DEVICE

BACKGROUND OF THE INVENTION

1. Field of the Invention

The present invention relates to a method of providing Musical Instrument Digital Interface (MIDI) functions in a portable device, and particularly to a method of setting up a MIDI setting table according to user settings, providing MIDI editing, recording, playing, and output

2. Description of the Related Art

In recent years, cellular phones, in addition to wireless communicability provide many other functions such as notebook, games and the like. MIDI function, that is, Musical Instrument Digital Interface, a musical standard specification, is hard to be applied thereto, however, due to design restrictions. For example, as shown in FIG. 1, a cellular phone has about 10 digit buttons and some function buttons, too few to offer MIDI editing and other functions. General MIDI functions include MIDI editing, recording, playing, and output. MIDI can conventionally provide 16 timbres, respectively provided by 16 channels. For example, channel 1 can provide a violin timbre, channel 2 a trumpet timbre, and so on. As a result, a single MIDI song requires considerable storage space and memory MIDI extension cards can be connected to a cellular phone to simulate MIDI functions, but this is expensive and inconvient.

SUMMARY OF THE INVENTION

In order to overcome the above problems, an object of the invention is to provide a method of enabling MIDI functions in a portable device, without additional cost. Also, provided is the ability to edit MIDI music without occupying undue memory, offering more MIDI songs compared to the prior art using the same memory.

In order to achieve the above objects, there is provided a method of playing MIDI music on a portable device, including providing a MIDI file with a plurality of channels, choosing a MIDI setting table with respect to the MIDI file, the setting table having a plurality of time points and corresponding channel numbers where one channel number corresponds to one channel, and sequentially enabling or disabling the channels corresponding to the channel numbers according to the time points, such that channels enabled or disabled indicate the status of their relative timbres' use.

The cited MIDI setting table is set by choosing a MIDI file with a plurality of channels and disabling the plurality of channels, sequentially setting time points and corresponding channel numbers, and storing the time points, channel numbers and MIDI file-related data as a MIDI setting table.

The invention further provides a method of outputting MIDI music on a portable device, including choosing a MIDI file with a plurality of channels, disabling the plurality of channels, sequentially setting time points and corresponding channel numbers where one channel number corresponds to one channel, storing the time points, channel numbers and MIDI file-related data as a MIDI setting table, sequentially enabling or disabling the channels corresponding to the channel numbers according to the time points in the MIDI setting table. Finally the channels enabled or disabled as a MIDI editing file are stored, and the MIDI editing file is output.

BRIEF DESCRIPTION OF THE DRAWINGS

FIG. 5 is an embodiment of FIG. 4 according to the invention;

FIG. 6 is another embodiment of FIG. 4 according to the invention;

DETAILED DESCRIPTION OF THE INVENTION

Figure 1:
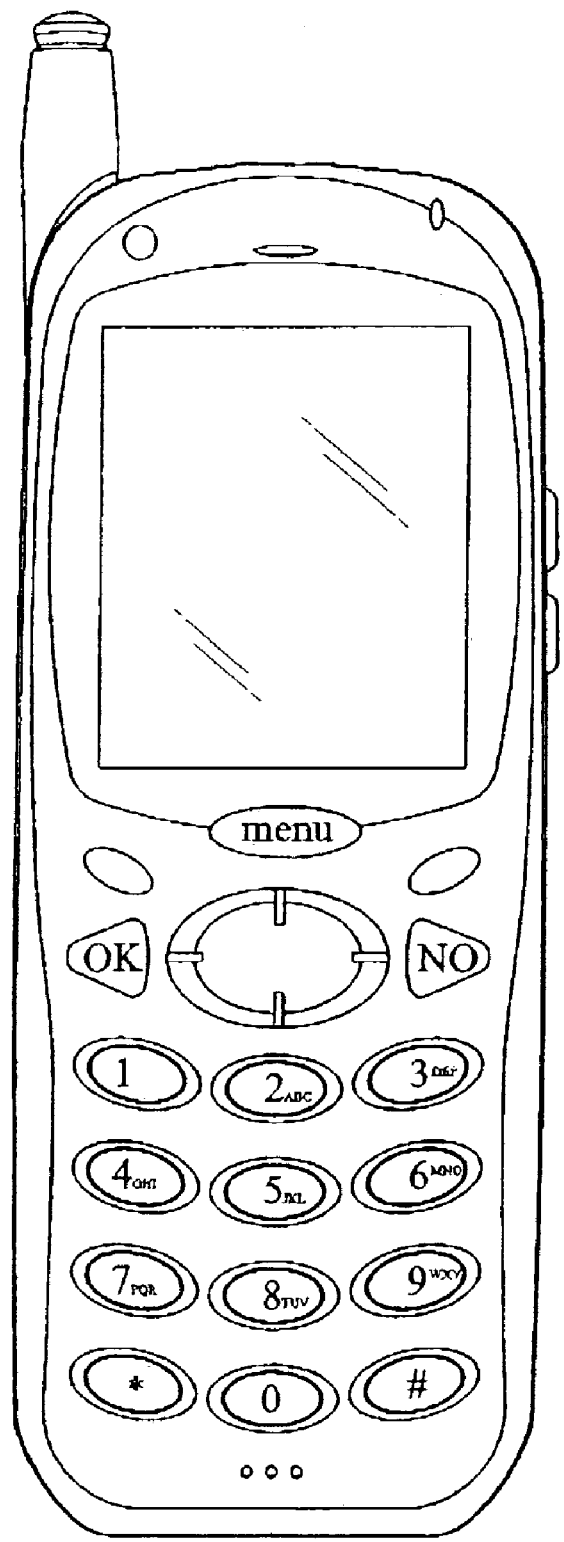
FIG. 1 is a schematic diagram of a typical cellular phone.
Figure 2:
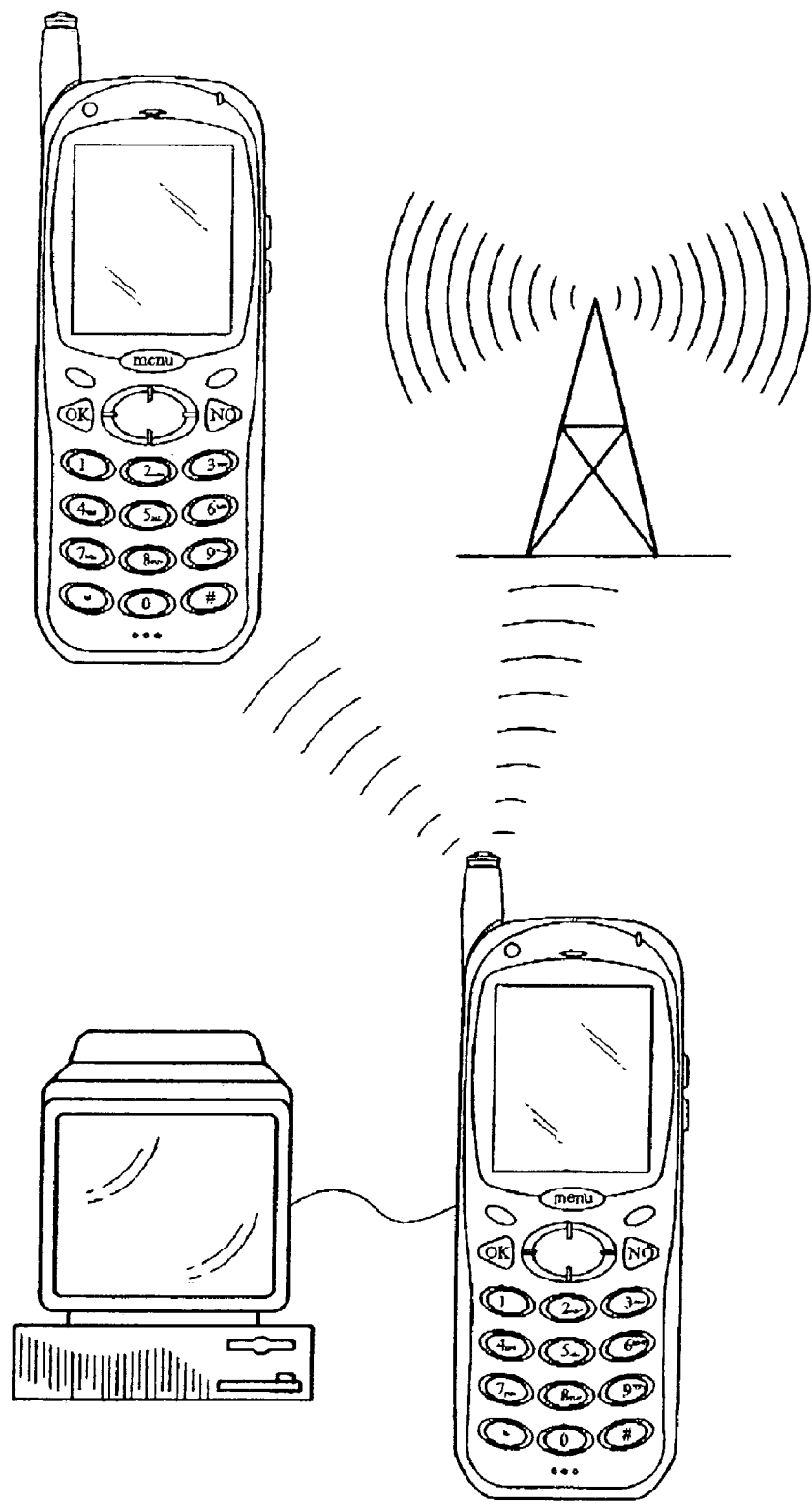
FIG. 2 is a schematic diagram of an input and output of FIG. 2.
Figure 3:
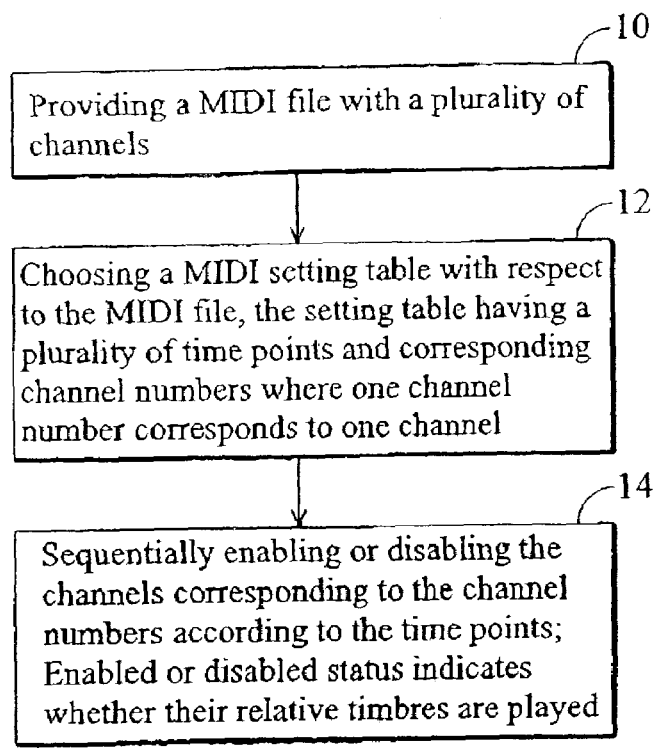
FIG. 3 is a flowchart of a MIDI playing method for a portable device according to the invention.

FIG. 3 is a flowchart of a MIDI playing method for a portable device according to the invention. As shown in FIG. 3, the MIDI playing method includes the following steps.

In step 10, a MIDI file with a plurality of channels is provided.

In step 12, a MIDI setting table with respect to the MIDI file is selected. The MIDI setting table has a plurality of time points and corresponding channel numbers and every channel number represents one channel, as shown in FIG. 5.

In step 14, the channels corresponding to the channel numbers are sequentially enabled or disabled according to the time points. An enabled channel will play its corresponding timbre and a disabled channel will not. As shown in FIG. 6, channel 1 is enabled, sounding a corresponding timbre at the beginning (0 seconds), and is then disabled to stop sounding the timbre after 10 seconds. The MIDI setting operations in FIG. 6 refer to the MIDI setting table of FIG. 5

Figure 4:
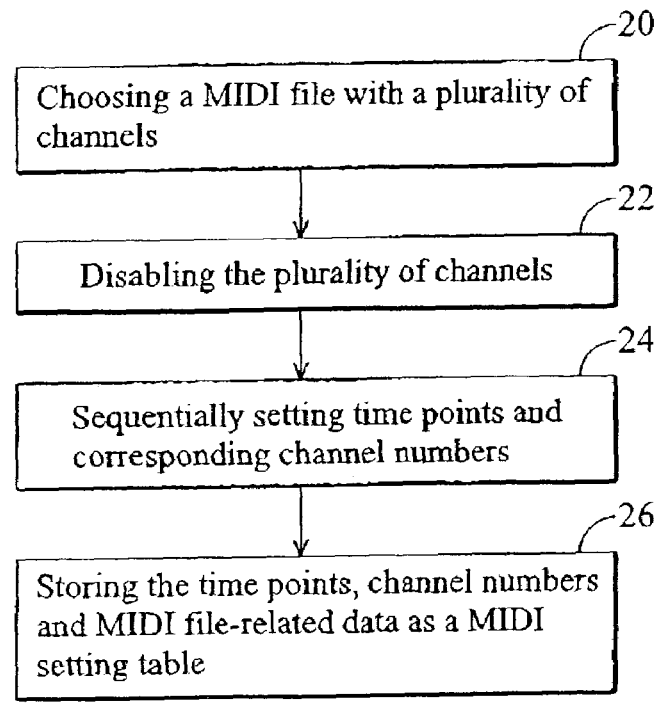
FIG. 4 is a flowchart of a setting method for a MIDI setting table of FIG. 3 according to the invention.

The cited MIDI setting table is set by a setting interface provided by the portable device. The setting operation is shown in FIG. 4 as below.

In step 20, a MIDI file is chosen. The inventive MIDI setting table requires little memory such that the portable device can provide MIDI editing, MIDI playing, and MIDI output functions according to the MIDI setting table and corresponding MIDI file(s).

In step 22, the plurality of channels of the MIDI file is disabled. All channels of every MIDI file are normally preset to an enabled state. For the purpose of personalization, MIDI editing is provided by disabling all channels and then setting the channels enabled/disabled as desired. Additionally, a step of storing previous enabled or disabled state of the channels is performed before Step 22.

In step 24, the time points and corresponding channel numbers are sequentially set. The user enters a setting interface that provides various time point and channel number options and sets desired time points and corresponding channel numbers. Additionally, when the user sets desired time points and corresponding channel numbers, the portable device can also provide a graphic interface. The graphic interface has a plurality of graphs with respect to every channel such that the user can choose a desired channel easily. As such, MIDI editing of the portable device becomes more user-friendly. When setting the time points, at the same time, the user also directly selects the desired graphs corresponding to the channels, such that the graphic interface can sequentially set the time points and corresponding channel numbers edited by the user.

Figure 8:
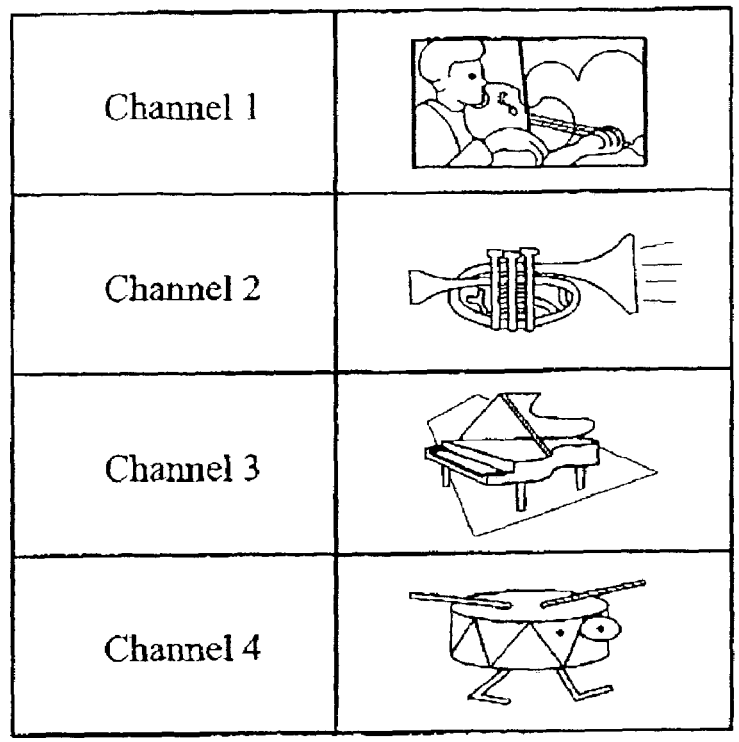
FIG. 8 is a diagram of the relationship between channels and timbres according to the invention.
Figure 9:
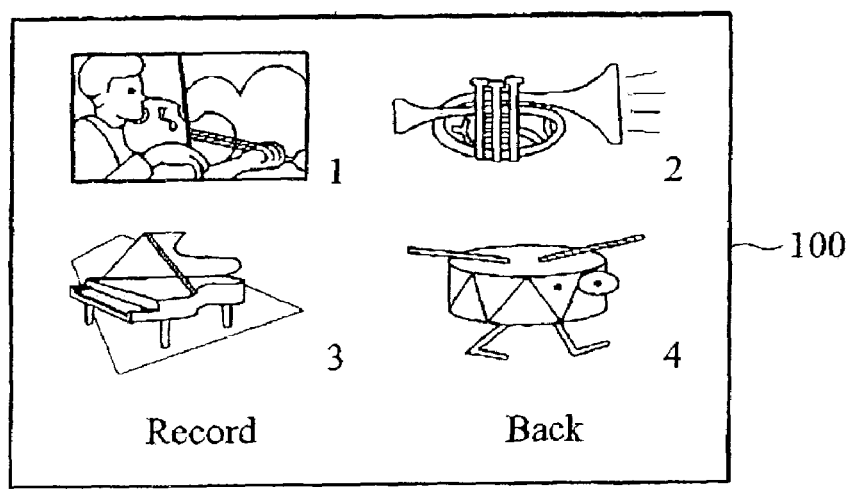
FIG. 9 is a schematic diagram of a graphic interface on the screen of a cellular phone according to the invention.

FIG. 8 is a relational diagram of a channel-to-timbre graph when applying the cited graphic interface. Here, an example of four channels is given, but is not limited thereto. As shown in FIG. 8, channels 1–4 represent violin, trumpet piano, and drum timbres corresponding to the violin trumpet, piano, and drum graphs. FIG. 9 is a schematic diagram of a graphic interface on the screen of a cellular phone according to the invention The graphs corresponding to the channels are directly placed on the screen 100 for display such that a user can directly select the desired channels corresponding to the graphs. If the cited screen 100 is a touch-panel, the user can select desired graphs directly on the panel to choose all desired channels.

In step 26, the cited time points, the channel numbers and MIDI file related data are stored as the MIDI setting table. The file related data is the filename. Because the MIDI setting table only stores the time points, channel numbers and MIDI file related data, it occupies less memory than in the prior art. Therefore, the invention car save memory space.

A further detailed description is now given, as seen in FIG. 5. The MIDI setting table of FIG. 5 has time points and channel numbers. Because all channels are disabled in the MIDI file as described in step 22, the portable device can sequentially enable or disable a channel timbre by a user setting. As described in step 24, the user can choose, but is not limited to, channel 1 at time point 0, channel 2 at 5 seconds, channel 1 at 10 seconds, channel 3 at 15 seconds, and channel 4 at 20 seconds. As described in step 26, the portable device stores the cited time points and channel numbers as a MIDI setting file. The MIDI setting operations of FIG. 6 correspond to the MIDI setting table of FIG. 5. Accordingly, as channel 1 timbre is enabled (played) at 0 second and channel 2 timbre is enabled at 5 seconds, the portable device can play the timbres of channels 1 and 2 at the same time. Channel 1 is disabled (not played) since it is originally played at 10 seconds. Only channel 2 timbre is still playing by the portable device. More, if channel 3 timbre is enabled at 15 seconds, the portable device will play the timbres of channels 2 and 3. When channel 4 timbre is enabled at 20 seconds, the portable device plays the timbres of channels 2, 3 and 4. Similarly, conditions other than those cited can be embodied. For example, the portable device can enable multiple channels first and disable one or more channels later.

Figure 7:
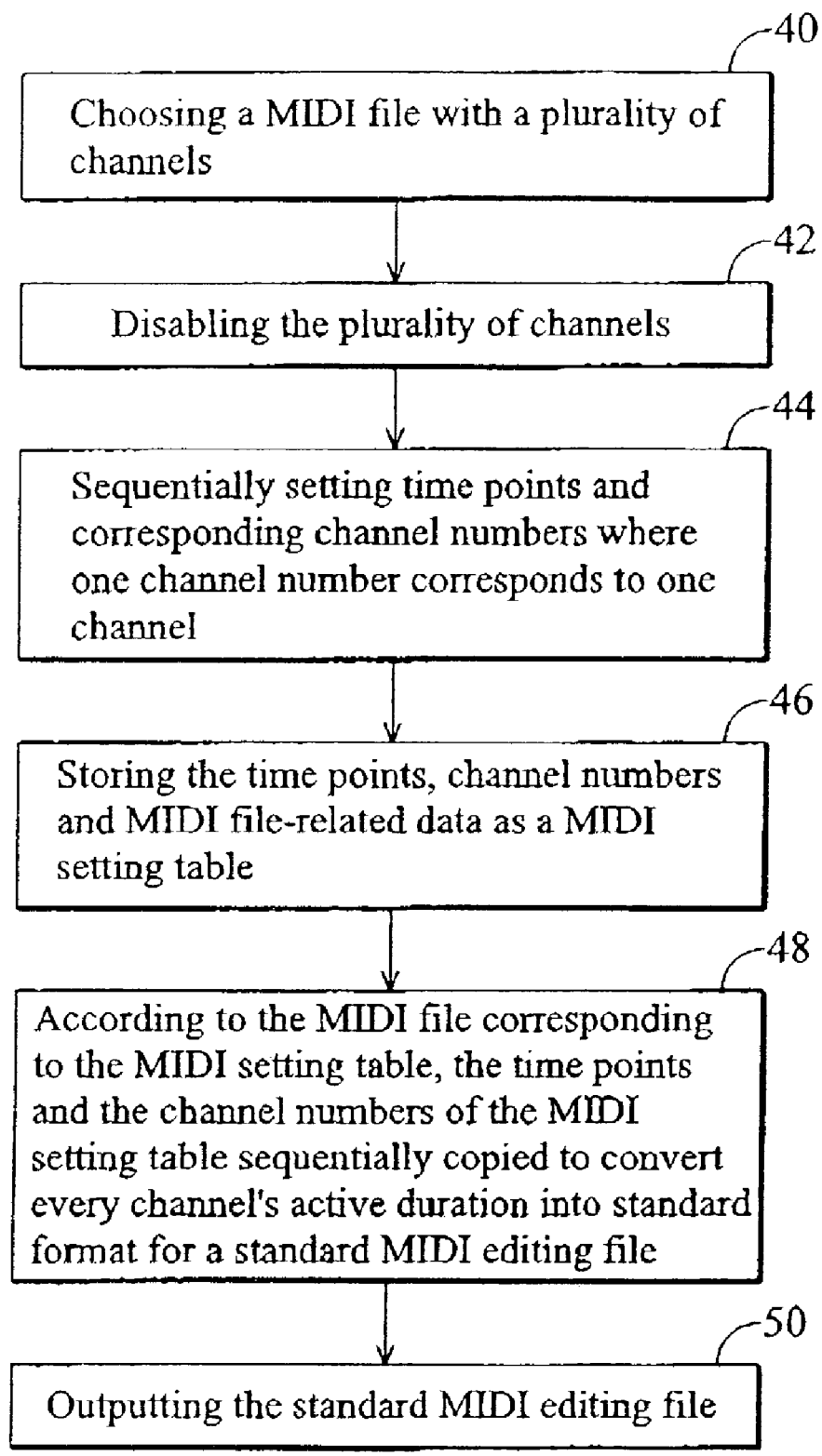
FIG. 7 is a flowchart of a MIDI outputting method from a portable device according to the invention.

Additionally, according to the MIDI setting table, the portable device also provides a MIDI music output method, as shown in FIG. 7, including the steps as below.

In step 40, a MIDI file is selected.

In step 42, time points and corresponding channel numbers are sequentially set, where one channel number corresponds to one channel.

In step 46, the time points, the channel numbers and MIDI-related data are stored as a MIDI setting table.

In step 48, according to the MIDI file corresponding to the MIDI setting table, the time points and the channel numbers of the MIDI setting table are sequentially copied to convert every channel's active duration into standard format for a standard MIDI editing file.

In step 50, the standard MIDI editing file is output. Due to a file specification of MIDI editing file the same as the standard MIDI file, the cited MIDI editing file can be output to any device supporting MIDI format, for example, another portable device or a computer.

The foregoing description of the preferred embodiments of this invention has been presented for purposes of illustration and description. Obvious modifications or variations are possible in light of the above teaching The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method of playing MIDI music on a portable device, comprising the steps:

providing a Musical Instrument Digital Interface (MIDI) file with a plurality of channels;

choosing a MIDI setting table with respect to the MIDI file, the MIDI setting table having a plurality of time points and corresponding channel numbers where one channel number corresponds to one channel; and sequentially enabling or disabling the channels corresponding to the channel numbers according to the time points;

wherein the channels' enabled or disabled status indicates whether their relative timbres are played.

2. The method as claimed in claim 1, wherein the MIDI setting table is set by:

choosing the MIDI file with the plurality of channels;

disabling the plurality of channels;

sequentially setting the time points and the channel numbers; and storing the time points, the channel numbers and MIDI file related data as the MIDI setting table.

3. The method as claimed in claim 2, wherein the step of sequentially enabling or disabling the channels corresponding to the channel numbers further comprises providing a graphic interface comprising a plurality of graphs, sequentially set and corresponding to the channels one-to-one such that the time points and corresponding channels can be set by means of the graphs.

4. The method as claimed in claim 2, wherein the MIDI-related data is the MIDI file's filename.

5. The method as claimed in claim 1, wherein the portable device is a cellular phone.

6. The method as claimed in claim 1, wherein the step of sequentially enabling or disabling the channels corresponding to the channel numbers according to the time points further comprises reversely enabling one of the channels when different time points correspond to one channel number with respect to the one channel.

7. The method as claimed in claim 2, wherein the step of disabling the plurality of channels further comprises storing the enabled or disabled state of the plurality of channels.

8. A method of outputting MIDI music on a portable device, comprising the steps:

choosing a MIDI file with a plurality of channels;

disabling the plurality of channels;

sequentially setting time points and corresponding channel numbers where one channel number corresponds to one channel;

storing the time points, the channel numbers and MIDI file related data as a MIDI setting table;

according to the MIDI file corresponding to the MIDI setting table, the time points and the channel numbers of the MIDI setting table being sequentially copied to convert every channel's active duration into standard format for a standard MIDI editing file; and outputting the standard MIDI editing file.

9. The method as claimed in claim 8, wherein formats of the MIDI editing file and the MIDI file are the same.

* * * * *